United States Patent Office 3,282,908
Patented Nov. 1, 1966

3,282,908
DYEABILITY OF POLYOLEFINS
Louis Port, Buffalo, N.Y., assignor to Allied Chemical Corporation, New York, N.Y., a corporation of New York
No Drawing. Filed Nov. 13, 1963, Ser. No. 323,242
8 Claims. (Cl. 260—93.7)

This invention relates to a novel method for the improvement of the dyeability of polyolefin fibers. It is especially concerned with a method for increasing the receptivity of polypropylene textile materials to organic dyes.

Polymers derived from alpha olefins such as ethylene, propylene and isobutylene, because of their many valuable characteristics such as strength, low density, high elasticity, resistance to solvents and other elements, are particularly useful in a wide variety of applications. Such olefin polymers are being manufactured in a number of forms including films, filaments, yarns, fabrics, ropes and particulated particles suitable for molding and the market for such products is rapidly increasing.

However, because of their general chemical inertness and extremely hydrophobic character, these polymers have little affinity for organic dyes and attempts at coloration have presented serious problems which have not heretofore been adequately solved. Being resistant to penetration by water and organic solvents which are swelling agents for various other synthetic resins and polymers, these polyolefin polymers cannot be satisfactorily dyed by conventional dyestuffs. Moreover, coloration of alpha olefin polymers by compound pigment-plastic mixtures in Banbury mixers, compound extruders or the like presents difficulties in obtaining adequate dispersions of the pigment in the polymer. Similarly, introduction of a dispersed pigment composition into a molten polyolefin, while satisfactory for some purposes, is undesirable for general utility in that the ultimate fabricator is required to maintain colored fiber stocks of all colors he may be likely to need. Furthermore, this operation does not yield the wide variety of shades and tints which might be obtained if the formed yarn or other structure could be treated by more conventional techniques.

A procedure for dyeing polyethylene fibers by application thereto of emulsions of oil soluble colors is capable of producing light to medium shades of acceptable fastness characteristics. However, such a procedure tends to leave a residue of the carrier oil on the goods which is removable only with difficulty as by drastic soaping or extraction procedures. Furthermore, in many instances excessive shrinkage of the dyed polyolefin fibers occurs thus rendering this method uneconomical and undesirable.

Thus the non-receptivity of polyolefins for dyestuffs has retarded their utilization in the textile field and accordingly it is a principal object of the present invention to provide a novel and effective method for increasing the dyeability of polyolefin polymers.

A further object of the invention is to provide a method for increasing the dyeability of polyolefin polymers which is economical and does not have a deleterious effect on fibers thereof.

These and other objects and advantages of this invention will become apparent from the detailed description set forth below.

In accordance with the present invention, it has now been discovered that the affinity of a normally solid polyolefin polymeric material for conventional dyes is markedly improved by treating said material with an organic isocyanate at elevated temperatures, i.e., above ambient, preferably 100° C. or higher, but below the fusion point of said polyolefin material. Thereafter the treated polymer may be exposed in a stream of inert gas, i.e., air, nitrogen and the like, at an elevated temperature, preferably above about 50° C. to complete the "setting" of the isocyanate in the polyolefin fiber and remove the excess isocyanate.

The process of the invention is unique in that it makes possible the obtention of deeper shades on the treated polyolefin materials than is possible to obtain on untreated materials and which shades are crock-free. Dyeings are obatined on the materials treated in accordance with the present invention which have many times the tinctorial strength of dyeings made in a similar manner but on untreated materials, which in many instances is completely undyed.

The process of this invention is applicable to normally solid polymers of alpha olefins which may be represented by the formula: $CH=CHR$, wherein R is hydrogen or a lower aliphatic hydrocarbon radical. Typical examples of such alpha olefins include ethylene, propylene and isobutylene. Polymers derived from these alpha olefins are structurally long chain hydrocarbon molecules.

Polyethylenes may contain a small number of branched chains or when polymerized in the presence of a co-reactant, may contain terminal groups such as alcohol, ester, ketone or ether groups, this latter procedure often being practiced in the preparation of low molecular weight polyethylenes, i.e., 1,000–5,000, as disclosed, for example, in U.S. Patents 2,504,400 and 2,683,141, of Michael Erchak, Jr. These polymers generally have fusion points below 100° C.

The higher molecular weight polyethylenes, which include the so-called "high pressure" polyethylene which have molecular weights, for example, between about 10,000 and about 30,000, and also the so-called "low pressure" polyethylenes which have molecular weights above about 50,000, have fusion points above 100° C. Both types of polyethylenes are well known and are described in the patent and other literature, for example, U.S. Patent 2,153,553 to Fawcett et al., and 2,188,465 to Perrin et al., relate to the preparation of "high pressure" polyethylene, while the preparation of "low pressure" polyethylene is desecribed in U.S. Patent 2,825,721 to Hogan et al.; U.S. Patent 2,824,089 to Peters and U.S. Patent 2,912,424 to Cash, Jr.

The preparation of polymers from propylene by the use of stereospecific catalysts, such as titanium tetrachloride and triethyl aluminum, and low pressures has been described in the patent literature. Note, for example, Natta et al., U.S. Patent 3,014,018. These workers have shown that polymers of the same alpha olefin may possess different crystal structures, viz. crystalline (isotactic) or amorphous (atactic). By use of specific catalyst mixtures and conditions of polymerization, one or the other or both forms can be prepared. Further, by the judicious use of selective solvents, these forms of the polymer can be separated on the basis of their different steric structure. It was found, moreover, that the two different forms differ considerably in their affinity towards organic dyestuffs, the isotactic form having the lesser affinity for coloring agents. It is a surprising feature of the process of this invention that the dyeability of both atactic and isotactic polypropylene can be increased to the point where both forms possess substantially equal affinity for organic dyestuffs.

Polymers from isobutylene and higher homologues can be prepared by methods similar to the stereospecific polymerization procedures referred to above, and the products are similarly charatcerized by poor affinity to organic dyestuffs.

A preferred method of carrying out the process of the present invention involves placing the poly(a-olefin) material in a suitable closed vessel which contains vapors of an isocyanate, preferably an aryl diisocyanate. The temperature of the vessel is maintained above ambient, preferably above about 100° C., but below the fusion point of the polyolefin material while said material is in contact with the isocyanate vapors. This treatment is continued for a period of time sufficient to adequately increase the polyolefin material's affinity for organic dyes.

The temperature of the treatment step can be varied over a broad range. Lower temperatures of treatment would favor the use of vacuum and/or longer contact times to obtain satisfactory results and hence, while operable, are not generally practical. When higher temperatures, i.e., up to the fusion point of the polyolefin material are used, shorter contact times give satisfactory results.

The contact time of the treatment step can also be varied over a broad range. As indicated above, this time is dependent on the temperature; i.e., the higher the temperature, the shorter the contact time required and vice versa. To some extent also, the longer the contact time, the greater the degree of improvement in the dyeability of the polyolefin material. Generally at temperatures within the range of 100° to 130° C., a contact time of about 1 hour is sufficient. However, since neither the contact time nor temperature is critical, great latitude in the selection of these variables is permitted and it will be within the skill of the trained chemist to select a combination of these two variables which will produce satisfactory results.

Following the above-described exposure of the polyolefin to isocyanate vapors, the material can be heated in a current of air or other inert gas for a suitable period of time. The temperature and duration of this second step are not critical and may vary considerably. Temperatures just above ambient, e.g., 50° C., can be used although temperatures in the range of 120° to 140° C. are preferred. For most purposes it is sufficient to place the treated polyolefin material in the gas stream for a period of about 2 to 15 minutes; the lower temperature, the longer the period of time. However, it is to be understood that periods of time longer than 15 minutes may be used if acceptable results are obtained.

While in the above-described process, the isocyanate is applied in vapor form, an alternative method of treating polyolefin materials with isocyanates involves immersing the polyolefin material in an isocyanate bath. Such a bath is prepared by dissolving a suitable amount (e.g., 5 parts by weight) of an organic isocyanate in an organic solvent such as benzene. The bath is preferably maintained at elevated temperatures during the treatment of the polyolefin material but not above the boiling point of the organic solvent. The polyolefin material should remain immersed in the bath for a period of time comparable to the contact time of the vapor process. The polyolefin material is then removed from the bath and heated in a current of air or other inert gas to evaporate the solvent and "set" the isocyanate.

In general, any organic isocyanate can be utilized in the present invention. Of course, isocyanates having an appreciable vapor pressure at a temperature of about 100° C. are preferred in the vapor process. Isocyanates which are useful in the present invention may be represented by the following formula:

$$R \cdot (N:CO)_n$$

wherein $n$ is 1, 2 or 3 and R is an aromatic, heterocyclic or aliphatic hydrocarbon radical or a mixed group comprising moieties from two or more of these radicals and containing from 2 to 20 carbon atoms. The hydrocarbon radical may also contain chlorine or other substantially non-functioning groups.

Examples of isocyanate compounds suitable for use in the present invention include ethyl isocyanate, phenyl isocyanate, hexamethylene diisocyanate, N-ethyl-3,6-carbazolyldiisocyanate, furfurylidene diisocyanate, diphenyl diisocyanate, triphenyl, diisocyanate, ethylene diisocyanate, phenylene diisocyanate, 2,4-tolylene diisocyanate, 2,6-tolylene diisocyanate, xylene diisocyanates, 4,4'-methylene bis(phenylene isocyanate), 2,4 chlorophenyl diisocyanate, 4,4'-methyl bis(cyclohexylisocyanate), toluene - 2,4,6-triisocyanate and triphenylmethane-4,4',4''-triisocyanate. Of course, the above are openly exemplary and it is not intended that this invention be limited thereto. Mixture of suitable isocyanates may also be used in the present invention.

After the polyolefin material has been treated in the manner described above, it may be dyed in a conventional manner with any suitable organic dyestuff such as acid wool dyes, dispersed colors and metallized or metallizable dyestuffs. The metallized or metallizable dyestuffs are preferred. Particularly good results are obtained with dyestuffs which contain about 1 atom of metal per 2 molecules of azo compound and are applied from substantially neutral baths. Typical examples of organic dyestuffs which may be used in the present invention, include, but are not limited to, the following:

Disperse dyestuffs:
   Nacelan Orange GR
     (C.I. Disperse Orange 3) _____ CI 11005
   Nacelan Blue NJ
     (C.I. Disperse Blue 3) _____ CI 61505
   1-hydroxy-4-substituted anilino
     anthraquinone.

Metallizable azo dyestuffs:
   C.I. Solvent Red 24 _____ CI 26105

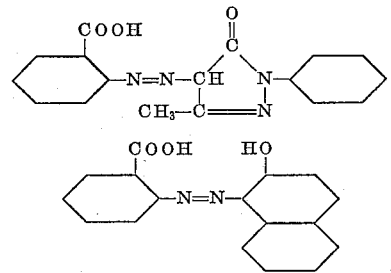

Metallized azo dyestuffs:

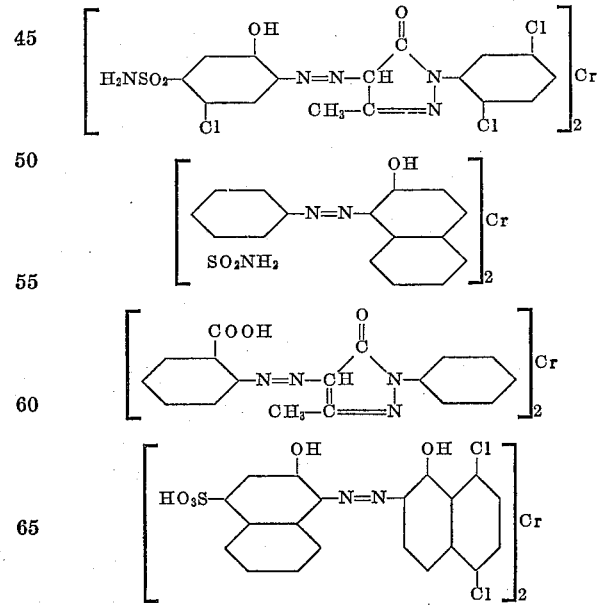

The following examples will illustrate the process of the present invention. Parts are by weight and temperatures are given in degrees centigrade.

*Example 1*

Polypropylene tricot fabric is suspended in a covered pot having on the bottom of said pot an open container of Nacconate 80 (a mixture of 80% 2,6 and 20% 2,4 tolylene diisocyanate). The pot is heated to 110°, and the suspended fabric is subjected to the vapors of Nacconate 80 in the closed heated pot for 2 hours. The treated fabric is transferred to a forced draft oven and maintained therein at 130° for 10 minutes. At the end of this period, the treated fabric increase in weight is about 0.65%.

A portion of the treated polypropylene fabric is dyed together with a like portion of untreated polypropylene. The dyebath contains 0.25% of a metallizable monoazo dyestuff, C.I. 26105. A ratio of 40:1, dyebath to fabric is used. The fabric portions are entered into the dyebath at ambient temperature and then worked as the bath is heated to 95° to 100° in ½ hour. The dyeing is continued for 1 hour at this temperature, after which the dyed portions are rinsed in cold water and soaped for 10 minutes at 65° in 0.25% Ivory soap solution. The dyed fabrics are rinsed in cold water and dried.

The treated portion of polypropylene is dyed in this manner a very much deeper red shade than the untreated portion and further, the treated material is fast to crocking.

*Example II*

The procedure of Example 1 above is repeated with the exception that after exposure of the polypropylene to vapors of isocyanate for 2 hours at 110°, the treated material is heated for 30 minutes at 130°. The treated material thus obtained shows an increase in weight of 0.73%.

The resultant treatem material is dyed as in Example I but with 0.25% of the chromium complex of diazotized 6 - amino - 4 - chloro - 1 - phenol - 3 - sulfonamide coupled into 1(2,5 - dichlorophenyl) - 3 - methyl - 5 - pyrazolone and a like amount of Tetranol (a highly sulfated fatty ester, acting as a dye assistant).

The treated polypropylene fabric is dyed a deep red shade fast to light and washing and is essentially crock-free. The dyeing is very much deeper than the untreated fabric dyed at the same time and in the same bath.

It can thus be seen that a novel and efficient method has been devised for increasing the dyeability of polyolefin materials. Moreover, as will be evident to those skilled in this art, the invention is not limited to the details of the foregoing illustrative examples and that changes can be made therein without departing from the spirit and scope of the invention.

For example, this process can be adapted to produce designs on polyolefin materials by covering the material prior to exposure to organic isocyanates with impermeable materials (e.g., aluminum foil) so as to prevent access of the isocyanate to the covered portions of the polymer. Thereafter, the treated material on being dyed will produce deeper colorations at these areas of the material exposed to the vapors since those areas will have been caused to have an increased dyeability whereas the covered portions will be colored lightly since the affinity for organic dyestuffs will not have been affected.

I claim:

1. A process for improving the dyeability of an alpha olefin hydrocarbon polymer which comprises contacting a composition consisting of said hydrocarbon polymer prior to the addition of dyestuff thereto with an organic isocyanate selected from the general formula R·(N:CO)n wherein *n* is 1, 2 or 3 and R is selected from the group consisting of heterocyclic radicals and aromatic and aliphatic hydrocarbon radicals containing 2 to 20 carbon atoms at an elevated temperature.

2. A process for improving the dyeability of an alpha olefin hydrocarbon polymer which comprises contacting a composition consisting of said hydrocarbon polymer prior to the addition of dyestuff thereto with an organic isocyanate selected from the general formula R·(N:CO)n wherein *n* is 1, 2 or 3 and R is selected from the group consisting of heterocyclic radicals and aromatic and aliphatic hydrocarbon radicals containing 2 to 20 carbon atoms at an elevated temperature not above the fusion point of said polymer and thereafter heating said polymer in a current of gas at a temperature not above the fusion point of said polymer.

3. A process as defined in claim 2 wherein said polymer is contacted with the vapors of an organic isocyanate.

4. An alpha olefin hydrocarbon polymer treated by the process of claim 1.

5. An alpha olefin hydrocarbon polymer treated by the process of claim 2.

6. An alpha olefin hydrocarbon polymer treated by the process of claim 3.

7. The process which comprises contacting a composition consisting of an alpha olefin hydrocarbon polymer with the vapors of an organic isocyanate selected from the general formula R·(N:CO)n wherein *n* is 1, 2 or 3 and R is selected from the group consisting of heterocyclic radicals and aromatic and aliphatic hydrocarbon radicals containing 2 to 20 carbon atoms at an elevated temperature not above the fusion point of said polymer, heating said polymer in a current of gas at a temperature not above the fusion point of said polymer and thereafter dyeing said polymer by application of an organic dyestuff.

8. An alpha olefin hydrocarbon polymer treated by the process of claim 7.

References Cited by the Examiner

UNITED STATES PATENTS 3,098,697  7/1963  Cappuccio et al. _____ 18—54

OTHER REFERENCES

"Derwent Belgium Patent Reports," 1961, vol. 80B, p. C12.

"The Dyeing of Polypropylene for Textiles," A.A.T.C.C. Intersectional Contest Paper prepared by the Metropolitan Section, 1964; bibliography, p. 5.

JOSEPH L. SCHOFER, *Primary Examiner.*

L. EDELMAN, *Assistant Examiner.*